March 4, 1924. 1,485,488
C. DIETZ ET AL
FURNACE FOR THE MANUFACTURE OF HYDROCHLORIC ACID AND SODIUM SULPHATE
Filed Aug. 8, 1921
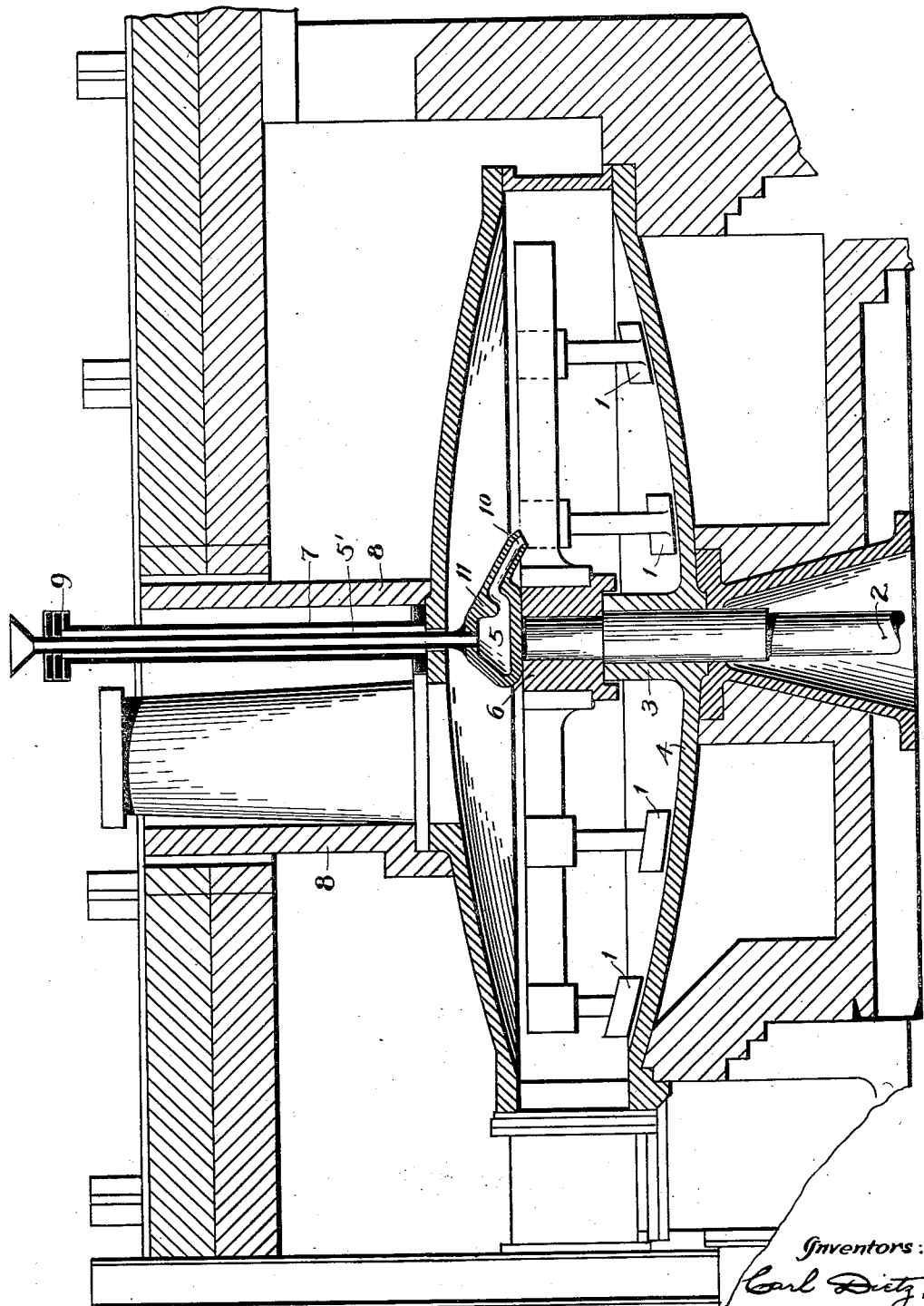

Patented Mar. 4, 1924.

1,485,488

UNITED STATES PATENT OFFICE.

CARL DIETZ AND MATTHIAS LATTEN, OF LEVERKUSEN, NEAR COLOGNE, PRUSSIA, AND WILHELM BOSSE, OF COLOGNE, GERMANY, ASSIGNORS TO FARBENFABRIKEN VORM. FRIEDR. BAYER AND CO., OF LEVERKUSEN, NEAR COLOGNE-ON-THE-RHINE, GERMANY.

FURNACE FOR THE MANUFACTURE OF HYDROCHLORIC ACID AND SODIUM SULPHATE.

Application filed August 8, 1921. Serial No. 490,765.

*To all whom it may concern:*

Be it known that we, CARL DIETZ, MATTHIAS LATTEN, and WILHELM BOSSE, citizens of Germany, residing, respectively, at Leverkusen near Cologne, Leverkusen near Cologne, and Cologne, Germany, have invented new and useful Improvements in Furnaces for the Manufacture of Hydrochloric Acid and Sodium Sulphate (for which we have filed applications in Germany, July 30, 1919; Germany, November, 28, 1919; Spain, July 20, 1920; Poland, January 10, 1921; Sweden, June 26, 1920; England, May 27, 1920; Japan, August 17, 1920; Belgium, June 12, 1920; Switzerland, June 17, 1920; Italy, June 16, 1920; France, June 11, 1920; Hungary, August 19, 1920; Austria, June 26, 1920; and in Czechoslovakia, July 8, 1920), of which the following is a specification.

Our invention relates to improvements in furnaces for the manufacture of hydrochloric acid and sodium sulphate.

Hydrochloric acid has been made from salt (sodium chlorid) and niter cake (sodium bisulfate) in a furnace in which the charge is mechanically stirred in a closed stationary pan.

Processes for the manufacture of hydrochloric acid and sodium sulphate from salt and sulfuric acid have failed because it was found impossible to obtain a proper distribution of the acid with the salt because of the difficulty of introducing the acid into the centre of the pan owing to the presence of the stirring mechanism at the centre of the pan, and so the passage of the acid into the outer zones of the pan could not be prevented. This led to waste of the sulphate.

According to our invention acid is led to the centre of the furnace and is distributed by means which move with the stirring mechanism.

A mode of carrying out the invention is illustrated in the accompanying drawing in which 1 are stirrers mounted on a vertical shaft 2 passing up through a bearing 3 in the bottom of the pan 4. The acid distributor consist of a vessel 5 secured to the boss 6 on which the stirrers 1 are mounted, liquid being led thereto by a vertical tube 5¹ passing into one wall of the vessel 5, from above the top of the furnace.

The tube 5¹ may be stationary or rotate with the vessel 5 and for the purpose of preventing the escape of fumes from the pan 4 is surrounded by a sleeve 7 which extends above the furnace through the sleeve 8 which surrounds the charge inlet in the usual manner. The sleeve 7 is made tight with the tube 5¹ by packing 9. The outlet or spout 10 leading the acid from the vessel 5 slightly out of the centre of the pan may be provided with a trap 11.

In place of the vessel 5 a mere tube may be employed which moves with the stirrers and which preferably terminates in an elbow.

Sulfuric acid flows uninterruptedly through the inlet tube 5¹ into the vessel 5 and is delivered near to the centre of the pan, and in so doing becomes heated to 100° C.

The manufacture of hydrochloric acid from salt and bisulfate takes place according to the equation:

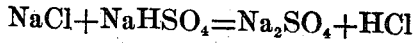

$$NaCl + NaHSO_4 = Na_2SO_4 + HCl$$

but from salt and sulfuric acid by our process according to the equation:

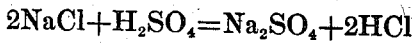

$$2NaCl + H_2SO_4 = Na_2SO_4 + 2HCl$$

i. e., with a twofold yield of hydrochloric acid and with the same yield of sulphate which results in a considerable saving of fuel and work.

We claim:—

1. A furnace for the manufacture of hydrochloric acid and sodium sulphate comprising, stirring mechanism, an acid supply, and means movable with said stirring mechanism and terminating adjacent the center of the furnace for delivering acid thereto.

2. A furnace for the manufacture of hydrochloric acid and sodium sulphate as defined in claim 1 in which the means for delivering acid comprises a vessel provided with an outlet which terminates adjacent the center of the furnace.

3. A furnace for the manufacture of hydrochloric acid and sodium sulphate as defined in claim 1 in which the means for delivering acid comprises a vessel having a trapped outlet.

4. A furnace for the manufacture of hydrochloric acid and sodium sulphate as defined in claim 1 in which the means for delivering acid comprises a tube terminating in a trapped spout.

5. A furnace for the manufacture of hydrochloric acid and sodium sulphate as defined in claim 1 in which the means for delivering acid comprises an acid supply pipe, a sleeve surrounding said pipe, and means situated above the furnace for rendering the sleeve gas-tight.

In testimony whereof we have hereunto set our hands in the presence of two subscribing witnesses.

CARL DIETZ. [L. S.]
 MATTHIAS LATTEN. [L. S.]
 WILHELM BOSSE. [L. S.]

Witnesses:
 HANS BRÜCKNER,
 ALFRED GUMCHER.